(12) United States Patent
Hirschman et al.

(10) Patent No.: US 6,217,169 B1
(45) Date of Patent: Apr. 17, 2001

(54) RIMLESS OR SEMI-RIMLESS SAFETY EYEGLASSES

(75) Inventors: Jason Hirschman, Bohemia; Richard Hirschman, Albertson, both of NY (US); Ji Woong Kim, Masan (KR)

(73) Assignee: Pareto Corporation, Bohemia, NY (US)

( * ) Notice: Subject to any disclaimer, the term of this patent is extended or adjusted under 35 U.S.C. 154(b) by 0 days.

(21) Appl. No.: 09/573,521

(22) Filed: May 17, 2000

(51) Int. Cl.[7] .................................................. G02C 1/08
(52) U.S. Cl. .......................... 351/106; 351/103; 351/110
(58) Field of Search .................................. 351/111, 110, 351/103, 106, 108, 109

(56) References Cited

U.S. PATENT DOCUMENTS 4,550,989 * 11/1985 Hafner ................................. 351/103

* cited by examiner

Primary Examiner—Hung Xuan Dang
(74) Attorney, Agent, or Firm—Ostrolenk, Faber, Gerb & Soffen, LLP

(57) ABSTRACT

An eyeglass assembly including an endpiece which is adapted to engage a flexible strand for holding a lens, the endpiece having an inner surface which is disposed adjacent to the lens when the lens is present; the inner surface of the endpiece having a front edge and a back edge for being located adjacent to front and back sides of the lens; the front edge being chamfered to define a chamfer angle of substantially 8° to 65° with respect to the lens; and the back edge being chamfered to define a chamfer angle of substantially 8° to 50° with respect to the lens. The chamfering of the edges of the endpiece is effective to reduce the risk of chipping the lens when the endpiece is adjusted to fit the wearer's head. Also disclosed is an elastic cushioning ring disposed between the lens and the frame and/or the flexible lens supporting strand in a rimless or semi-rimless frame.

26 Claims, 2 Drawing Sheets

RIMLESS OR SEMI-RIMLESS SAFETY EYEGLASSES

BACKGROUND OF THE INVENTION

The invention relates to an improved rimless or semi-rimless safety eyeglass frame, and more particularly to an improved endpiece and a cushioning ring for such a frame.

SUMMARY OF THE INVENTION

The invention relates to improvements in a rimless or semi-rimless safety eyeglass frame.

The corner of the eyeglass frame, where the screws are located for attaching the frame to the temple, is called the endpiece. Relative movement between the endpiece and the lens at the corners of the endpiece can cause chipping of certain types of plastic lenses. This chipping occurs most often when an optician needs to adjust the endpieces inwardly, to fit a person whose head is more narrow than the standard fit for which the eyeglass frame was built. This adjustment is accomplished by bending each endpiece inward, toward the user's head, with pliers, thereby narrowing the angle defined by the temples and the front of the eyeglass frame. It is during this inward bending that pressure is exerted on the plastic lens, and often causes the lens to chip or crack. Chipping can also occur when the optician must bend the endpieces outward, to accommodate a wearer with a wide head.

This problem is more acute in a rimless or semi-rimless frame in which the lens is secured with a metal wire as opposed to a nylon filament, and particularly, when the lens is made of plastic. The problem is especially acute with extremely thin lenses, and with plastic safety lenses, which are required to be relatively thick according to current safety standards, i.e., not less than 3 millimeters thick. The thickness can be even greater if needed for a particular prescription.

For present purposes, "safety" eyeglasses are defined as protective eyewear that conforms to the American National Standard Institute's (ANSI) Z-87 "Practice for Occupational and Educational Eye and Face Protection." The present standard is designated as ANSI Z-87.1-1989. The present standard requires prescription lenses to be 3 mm thick for most prescriptions (2.5 mm is allowed for a limited number of prescriptive powers). It is believed that an upcoming revision of the ANSI standard may be based not on this "design" requirement but rather on a "performance" requirement, and may allow 2 mm lenses.

This problem of damage to the lenses of safety eyeglasses has not been solved up to now. In particular, it has been believed impossible to provide plastic rimless or semi-rimless prescription safety eyeglass frames, because it has been impossible to meet the stringent impact requirements necessary to meet government standards for safety eyewear. Only recently have the present applicants developed an effective semi-rimless safety eyeglass frame, disclosed in Ser. No. 09/425,120 filed Oct. 22, 1999 now U.S. Pat. No. 6,099,119, incorporated by reference.

With the greater use of polycarbonate (available from General Electric under the trademark Lexan) and CR-39 plastic for ophthalmic lenses, rimless eyewear has become more popular. Plastic lenses, regardless of the material, can be easily cut to accommodate the rimless-type bevel. However, a problem with CR-39 plastic is that it can chip or flake under certain types of stress. Though it is shatter-resistant, it readily breaks and can chip as well. The endpiece (corner) area of the frame is a primary area where stress is likely to be induced due to the flitting adjustments performed by the optician. If the endpiece is bent beyond a very limited range, and if the endpiece is not chamfered, the endpiece can contact the edge of the CR-39 plastic lens and chip it, making it unusable.

The inventors have observed that this chipping or flaking of plastic safety lenses can be avoided by providing the endpiece, particularly on the interior side but also advantageously on the exterior side, with a chamfer defining a relief angle between the endpiece and the lens. The relief angle may be varied according to the nature of the particular lens and endpiece and their specifications. The chamfer provides enough relief so that the endpiece will not exert pressure on the edge of a prescription lens, causing sufficient stress to chip or flake the plastic lens material, when the eyeglass temples are bent inward to be fitted to the user's head. Instead the endpiece will twist inward without bearing upon and damaging the lens.

The range of the rear edge chamfer angle is about 8° to 50°, for example about 40° as shown in the drawings. The range of the front edge chamfer angle is about 8° to 65°, for example about 12° as shown in the drawings. A front edge chamfer angle of up to 65° may be useful, for example, for a wearer with a large head. The rear edge chamfer angle probably does not have to be so large, unless the wearer has an exceptionally narrow head.

The specific chamfer angles can be chosen by those having the ordinary degree of skill in this art, depending on the design of the frame, for example the configurations of the front and back surfaces of the frame. The illustrated angles have been found to be useful average values for the general marketplace. However, with other frame configurations than those illustrated, the 40° and 12° angles may not be optimal.

Other chamfer angles, even those not within the combination of ranges described above, may be appropriate for a frame with an unusual configuration. It is sufficient for the purposes of the invention if the chamfer angles chosen are effective to reduce lens chipping when the frame is adjusted to fit the wearer's head.

Although the above invention has general applicability to other types of eyeglasses, the invention finds specific utility in prescriptive safety eyewear utilizing plastic lenses because of the requirements mandated by government standards, and the difficulties associated with rimless or semi-rimless eyeglass frames. It is probably for these reasons that no rimless or semi-rimless frames exist on the prescription side of the safety eyewear market.

A second problem of known safety eyeglasses concerns the potential stresses on the lens that can be caused by the movement of the lens in a different direction from the reverse groove in the metal eyewire. This too can cause chipping of certain types of plastic lenses.

In addition, all eyeglass frames are bent to a common base curve (known as a 6-Base lens curve). However, there are many prescription lenses that must be made for either a flatter or more curved base curve—and consequently, the frame must be bent to match the lens curvatures.

To overcome the potential chipping (or flaking) of some types of plastic lenses, a cushioning ring of an elastic material is inserted so as to prevent the metal frame from exerting stress on the plastic lens. By adding an elastic ring or band (which may be made for example of silicone material or synthetic rubber), an air space is created between the plastic lens and the metal eyerim. This air space prevents the metal eyerim from having direct contact with the plastic lens. Further, it provides more space for the angling of the endpiece during adjustment to help keep the stress off the lens itself.

Furthermore, it does this around the entire circumference of the lens. Some areas of the lens are more apt to be stress-sensitive (namely, any corner area and the endpiece area). The cushioning ring by nesting inside the lens groove enables the lens to avoid stresses anywhere there is contact between the lens and the eyerim or rimless wires.

Another benefit of the cushioning ring is to effectively allow for greater tolerance when grooving the lens. If a rimless lens is grooved too deep, then it will be too loose to fit properly inside the frame. The cushioning ring allows the optical laboratory to have greater latitude in the cutting of the groove. This can be helpful as grooving cutters wear and settings are changed. As lenses are expensive, it enables the laboratory to reduce their spoilage.

The cushioning ring can be made of any stretchable or compressible material. For example, it can be rubber, synthetic rubber, silicone, or any similar type of material. The color of the cushioning ring material can be clear or of any color that is suitable from a cosmetic standpoint. As styles change, likewise will color preferences. Similarly, the thickness of the cushioning ring material can vary. The deeper the lens groove, the greater the thickness of the cushioning ring material.

The cushioning ring has the following functions:
a) provides an air space between the metal frame materials (the eyerim, endpiece, eyewires, etc.) and the plastic lens as cartilage functions between bones.
b) provides a cushion-effect so that the male eyerim groove and the base of the female lens groove are precluded from having direct contact.

Besides the use of the cushioning ring as described above, these functions can be accomplished in various other ways, such as:
1) coating the metal eyerim (shaped like a "T") with an elastic coating;
2) fusing an elastic material to the metal eyerim; and
3) coating and/or fusing elastic materials on specified areas only (not around the entire eyerim); for example, just coating or fusing elastic on the side of the endpiece or just part of the T-grooved eyerim, or just on the very thin metal rimless wires at the bottom of the semi-rimless frames.

Other features and advantages of the present invention will become apparent from the following description of embodiment of the invention which refers to the accompanying drawings.

DETAILED DESCRIPTION OF EMBODIMENTS OF THE INVENTION

Figure 3:
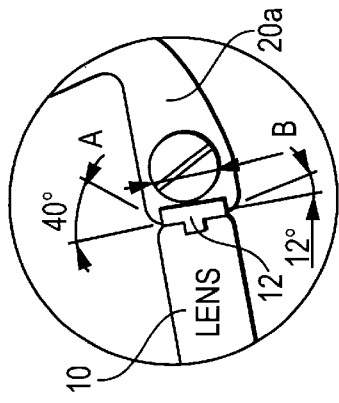
FIG. 3 is a top detail view corresponding to a portion of FIG. 2, showing the lens and endpiece of the eyeglass frame on a larger scale.
Figure 4:
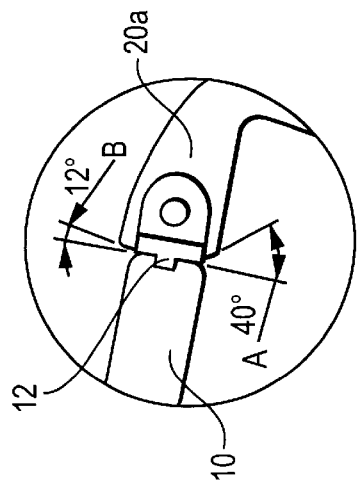
FIG. 4 is a bottom detail view of the lens and endpiece corresponding to FIG. 3.
Figure 1:
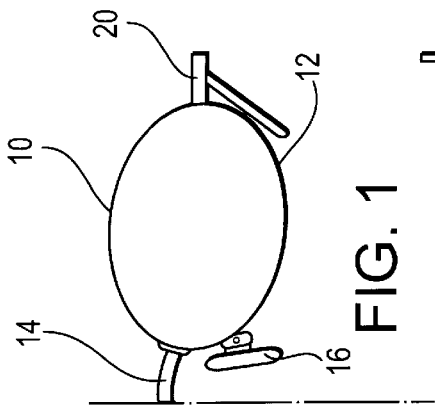
FIG. 1 is a front view of part of an eyeglass frame showing the lens, endpiece and temple.
Figure 2:
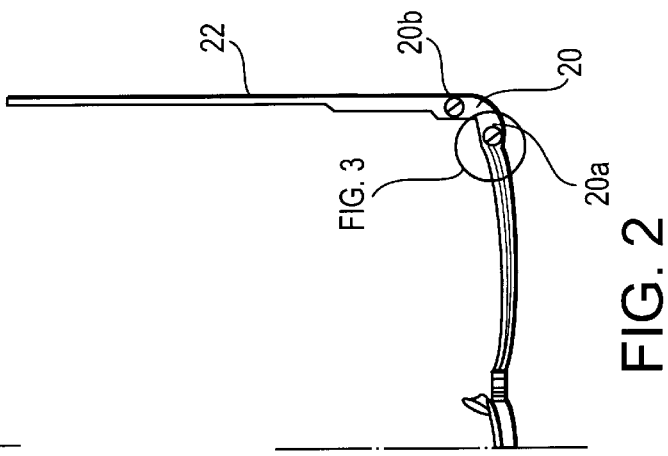
FIG. 2 is a top view corresponding to FIG. 1.

Referring to FIG. 1, there is shown an eyeglass frame according to an embodiment of the invention. FIG. 2 is a top view corresponding to FIG. 1. FIG. 3 is a top detail view corresponding to a portion of FIG. 2, showing the lens and endpiece of the eyeglass frame on a larger scale. FIG. 4 is a bottom detail view of the lens and endpiece corresponding to FIG. 3.

The eyeglass frame includes a lens 10, a semi-rimless frame 12, a bridge 14, a nose pad 16 and an endpiece 20. The endpiece 20 is generally L-shaped and at a first end 20a is attached to the frame 12, and at a second end 20b is attached to a temple 22.

At a rear edge of the end 20a of the endpiece 20, a chamfer angle A is formed, which is in the range of approximately 8° to 50° and preferably about 40°. As described above, it has been found that a chamfer angle of about 40° is effective to prevent chipping and flaking of the lens as described above, when the endpiece and/or the temple is bent inward, i.e., toward the left in FIG. 2, to be adjusted to the head of the user.

At the front edge of the end 20a of the endpiece 20 is a second chamfer angle B which is in a range of approximately 8° to 65°, and preferably about 12°. This range of the front angle B has been found to be effective to avoid damage to the lens due to minor forward movements of the endpiece with respect to the lens which may occur during use or during the adjustment process.

The chamfer angles A and B are advantageously formed over the entire vertical extent of the endpiece.

For an eyeglass frame having an unusual configuration, the skilled individual may select other chamfer angles, even if not within the combination of ranges described above, as long as the angles chosen are effective to reduce lens chipping when the frame is adjusted to fit the wearer's head.

Figure 5:
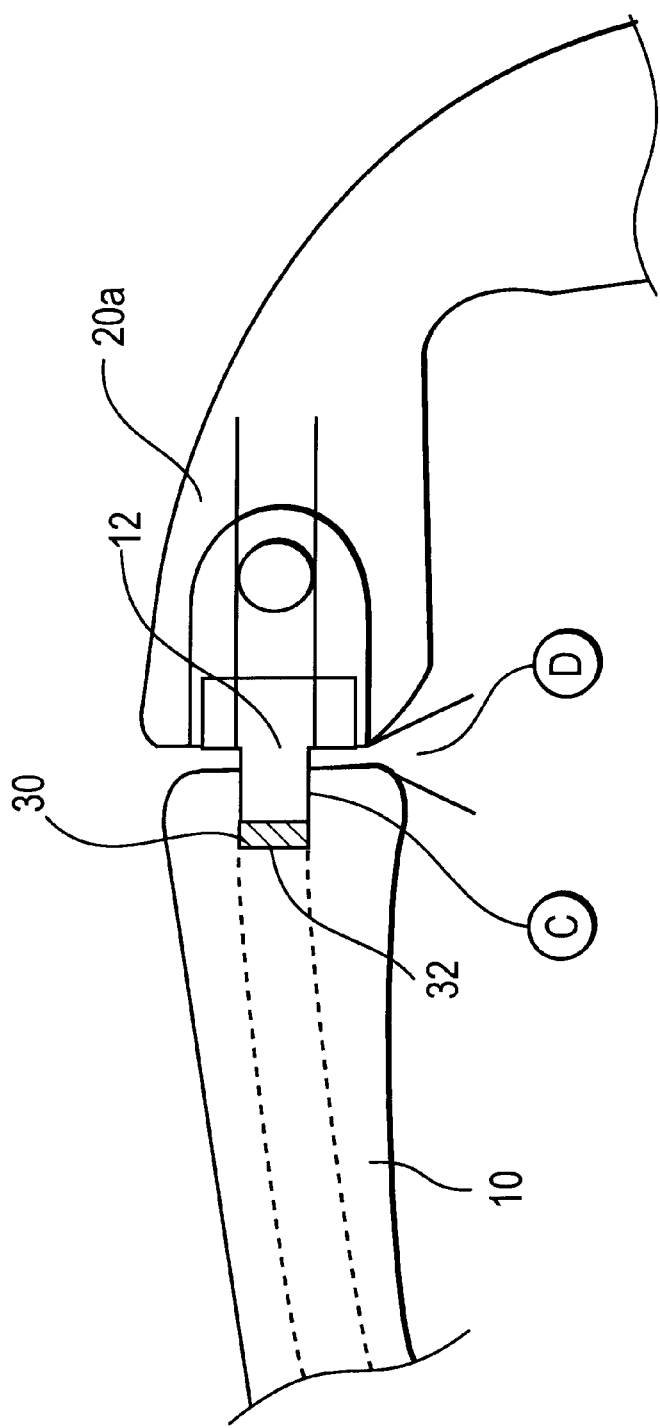
FIG. 5 is a view similar to FIG. 4 showing a lens and endpiece together with an elastic cushioning ring.

FIG. 5 is a view similar to FIG. 4 showing a lens and endpiece together with an elastic cushioning ring according to a second embodiment of the invention. For simplicity, elements and parts like those in the first embodiment are referred to by the same references and redundant description is omitted.

In FIG. 5 an elastic band 30 is placed around the lens 10 so as to separate the frame 12 and the bottom of the lens groove 32. As shown, the presence of the elastic band 30 creates an air space between the frame 12 and the lens 10, the air space comprising a portion designated C between the frame 12 and the sides of the groove 32, and a portion designated D between the frame 12 and the outer circumference of the lens 10.

In rimless and semi-rimless eyeglasses, all or part of the lens is surrounded or supported by a metal wire or plastic filament as described above, in addition to a frame and/or endpiece as shown in FIG. 5. At those portions of the lens, the elastic band 30 may be disposed between the wire or filament and the bottom of the lens groove 32.

In general, regardless of the specific type of frame, metal wire, or plastic filament in a given pair of eyeglasses, and regardless of the presence or absence of a groove in a given portion of a lens, the elastic band 30 is advantageously used to cushion and protect the edge of the lens.

Although the present invention has been described in relation to particular embodiments thereof, many other variations and modifications and other uses will become apparent to those skilled in the art. Therefore, the present invention is not limited by the specific disclosure herein.

What is claimed is:
1. A safety eyeglass assembly, comprising:
a plastic safety lens having a front side and a back side for being located remote from and close to a wearer, respectively;

a flexible strand at least partly surrounding and supporting the lens;

an endpiece for supporting the flexible strand, said endpiece having an inner surface disposed adjacent to the lens;

said inner surface of said endpiece having a front edge and a back edge which are located adjacent to said front and back sides of said lens, respectively;

said front edge being chamfered to define a chamfer angle of substantially 8° to 65° with respect to said lens;

said back edge being chamfered to define a chamfer angle of substantially 8° to 50° with respect to said lens.

2. A safety eyeglass assembly as claimed in claim 1, wherein said chamfer angle of said back edge is substantially 40°.

3. A safety eyeglass assembly as claimed in claim 2, wherein said chamfer angle of said front edge is substantially 12°.

4. A safety eyeglass assembly as claimed in claim 1, wherein said chamfer angle of said front edge is substantially 12°.

5. A safety eyeglass assembly as claimed in claim 1, further comprising an upper frame portion, said upper frame portion being secured to said endpiece, said flexible strand being secured to said upper frame portion and defining a lower frame portion whereby said upper and lower frame portions coact to surround and support the lens.

6. A safety eyeglass assembly as claimed in claim 5, further comprising an elastic material disposed at the outside of said lens and inside at least one of said upper and lower frame portions.

7. A safety eyeglass assembly as claimed in claim 6, wherein said elastic material is disposed in a groove formed at the outside of the lens.

8. A safety eyeglass assembly as claimed in claim 1, further comprising an elastic material disposed at the outside of the lens and inside said flexible strand.

9. A safety eyeglass assembly as claimed in claim 8, wherein said elastic material is disposed in a groove formed at the outside of the lens.

10. A safety eyeglass assembly as claimed in claim 1, wherein said lens is at least 2 mm in thickness.

11. A safety eyeglass assembly as claimed in claim 1, wherein said lens is at least 3 mm in thickness.

12. A safety eyeglass assembly as claimed in claim 11, wherein said lens is made of Lexan polycarbonate.

13. A safety eyeglass assembly as claimed in claim 11, wherein said lens is made of C-39 plastic.

14. An eyeglass assembly, comprising:

an endpiece which is adapted to engage a flexible strand for holding a lens, said endpiece having an inner surface which will be disposed adjacent to the lens when the flexible strand and lens are present;

said inner surface of said endpiece having a front edge and a back edge for being located adjacent to front and back sides of the lens, respectively;

said front edge being chamfered to define a chamfer angle of substantially 8° to 65° with respect to the lens;

said back edge being chamfered to define a chamfer angle of substantially 8° to 50° with respect to the lens.

15. An eyeglass assembly as claimed in claim 14, further comprising an upper frame portion, said upper frame portion being secured to said endpiece, whereby when said flexible strand and lens are present, said flexible strand will define a lower frame portion, and said upper and lower frame portions will coact to surround and support the lens.

16. An eyeglass assembly as claimed in claim 15, further comprising a flexible strand attached to said endpiece.

17. An eyeglass assembly as claimed in claim 16, further comprising a plastic safety lens held by said flexible strand and said upper frame portion.

18. An eyeglass assembly as claimed in claim 17, further comprising an elastic material disposed at an outside edge of said lens.

19. An eyeglass assembly as claimed in claim 14, further comprising a flexible strand attached to said endpiece.

20. An eyeglass assembly as claimed in claim 19, further comprising a plastic safety lens held by said flexible strand.

21. An eyeglass assembly as claimed in claim 20, further comprising an elastic material disposed at an outside edge of said lens.

22. An eyeglass assembly which is adapted to reduce the risk of chipping of said lens when said eyeglass assembly is adjusted to fit the head of the wearer, comprising:

an endpiece which is adapted to engage a flexible strand for holding a lens, said endpiece having an inner surface which will be disposed adjacent to the lens when the flexible strand and lens are present;

said inner surface of said endpiece having a front edge and a back edge for being located adjacent to front and back sides of the lens, respectively;

said front edge and said rear edge of said inner surface of said endpiece being chamfered so as to reduce the risk of chipping of said lens when said eyeglass assembly is adjusted to fit the head of the wearer.

23. A method of reducing the risk of chipping of a lens when an eyeglass assembly for holding the lens is adjusted to fit the head of a wearer, said eyeglass assembly comprising:

an endpiece which is adapted to engage a flexible strand for holding a lens, said endpiece having an inner surface which will be disposed adjacent to the lens when the flexible strand and lens are present;

said inner surface of said endpiece having a front edge and a back edge for being located adjacent to front and back sides of the lens, respectively;

said method comprising the step of chamfering the front edge and rear edge of the inner surface of the endpiece so as to reduce the risk of chipping of the lens when the eyeglass assembly is adjusted to fit the head of the wearer.

24. The method of claim 23, further comprising the step of chamfering the front edge of the endpiece at an angle of substantially 8–65° with respect to the lens.

25. The method of claim 23, further comprising the step of chamfering said back edge of the endpiece at an angle of substantially 8–50° with respect to the lens.

26. The method of claim 23, further comprising the step of disposing an elastic material adjacent to said inner surface of said endpiece for spacing the endpiece from the lens when the lens is present.

* * * * *